United States Patent
Rajab et al.

(10) Patent No.: US 11,190,635 B2
(45) Date of Patent: *Nov. 30, 2021

(54) SYSTEM AND METHOD FOR PERSONALIZED AND ADAPTIVE APPLICATION MANAGEMENT

(71) Applicant: DMAI, Inc., Los Angeles, CA (US)

(72) Inventors: Nawar Rajab, Glendale, CA (US); Nishant Shukla, Hermosa Beach, CA (US)

(73) Assignee: DMAI, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,449

(22) Filed: Jan. 8, 2020

(65) Prior Publication Data

US 2020/0145527 A1 May 7, 2020

Related U.S. Application Data

(63) Continuation of application No. 16/233,566, filed on Dec. 27, 2018, now Pat. No. 10,567,570.
(Continued)

(51) Int. Cl.
  *H04W 4/021* (2018.01)
  *H04M 1/72454* (2021.01)
  *H04L 29/08* (2006.01)

(52) U.S. Cl.
  CPC ........ *H04M 1/72454* (2021.01); *H04L 67/22* (2013.01); *H04L 67/306* (2013.01); *H04W 4/021* (2013.01)

(58) Field of Classification Search
  CPC ....... H04L 51/02; H04L 51/04; H04L 51/046; H04L 51/10; H04L 65/1069; H04L 51/32;
  (Continued)

(56) References Cited

U.S. PATENT DOCUMENTS

| 8,719,217 | B1 | 5/2014 | Vivalda et al. | |
|---|---|---|---|---|
| 2004/0148375 | A1* | 7/2004 | Levett | G06F 9/46 709/223 |
| 2008/0015058 | A1* | 1/2008 | Noble et al. | A63B 63/007 473/423 |

(Continued)

FOREIGN PATENT DOCUMENTS

WO 2017173141 A1 10/2017

OTHER PUBLICATIONS

International Search Report and Written Opinion dated Mar. 22, 2019 in International Application PCT/US2018/067634.
(Continued)

*Primary Examiner* — Jean A Gelin
(74) *Attorney, Agent, or Firm* — Venable LLP

(57) ABSTRACT

The present teaching relates to method, system, and medium for cross network communications. Information related to an application running on a user device is first received, which includes a state of the application and sensor data obtained with respect to a user interacting with the application on the user device. A request is sent to an application server for an instruction of a state transition of the application. A light weight model (LWM) for an object involved in the state transition is received and is personalized based on at least one of the sensor data and one or more preferences related to the user to generate a personalized model (PM) for the object, which is then sent to the user device.

18 Claims, 18 Drawing Sheets

Related U.S. Application Data

(60) Provisional application No. 62/612,024, filed on Dec. 29, 2017.

(58) Field of Classification Search
CPC ...... H04L 51/36; H04W 28/00; H04W 28/02; H04W 28/0215; H04W 28/0231; H04W 28/0247; H04W 4/18; H04W 28/06; H04W 4/021
See application file for complete search history.

(56) References Cited

U.S. PATENT DOCUMENTS

| | | | |
|---|---|---|---|
| 2008/0172173 A1 | 7/2008 | Chang et al. | |
| 2008/0235258 A1* | 9/2008 | Chung et al. | ........... G06F 40/14 |
| 2009/0186693 A1* | 7/2009 | Panoff | ................... A63F 13/42 |
| | | | 463/31 |
| 2011/0077085 A1* | 3/2011 | Finn et al. | ............ A63F 13/525 |
| | | | 463/42 |
| 2011/0119716 A1* | 5/2011 | Coleman, Sr. | ......... H04N 7/181 |
| | | | 725/62 |
| 2012/0086630 A1* | 4/2012 | Zhu et al. | ............. A63F 13/355 |
| | | | 345/156 |
| 2015/0356451 A1* | 12/2015 | Gupta | ................... G06F 21/552 |
| | | | 706/52 |
| 2016/0029426 A1* | 1/2016 | Bangolae et al. | .... H04W 72/04 |
| | | | 370/329 |
| 2017/0139879 A1* | 5/2017 | Sharifi et al. | ......... G06F 3/0482 |
| 2018/0367484 A1* | 12/2018 | Rodriguez et al. | ...... H04L 51/02 |

OTHER PUBLICATIONS

Office Action dated Jun. 18, 2021 in U.S. Appl. No. 16/233,716.
International Preliminary Report on Patentability dated May 20, 2021 in International Application PCT/US2019-059841.

* cited by examiner

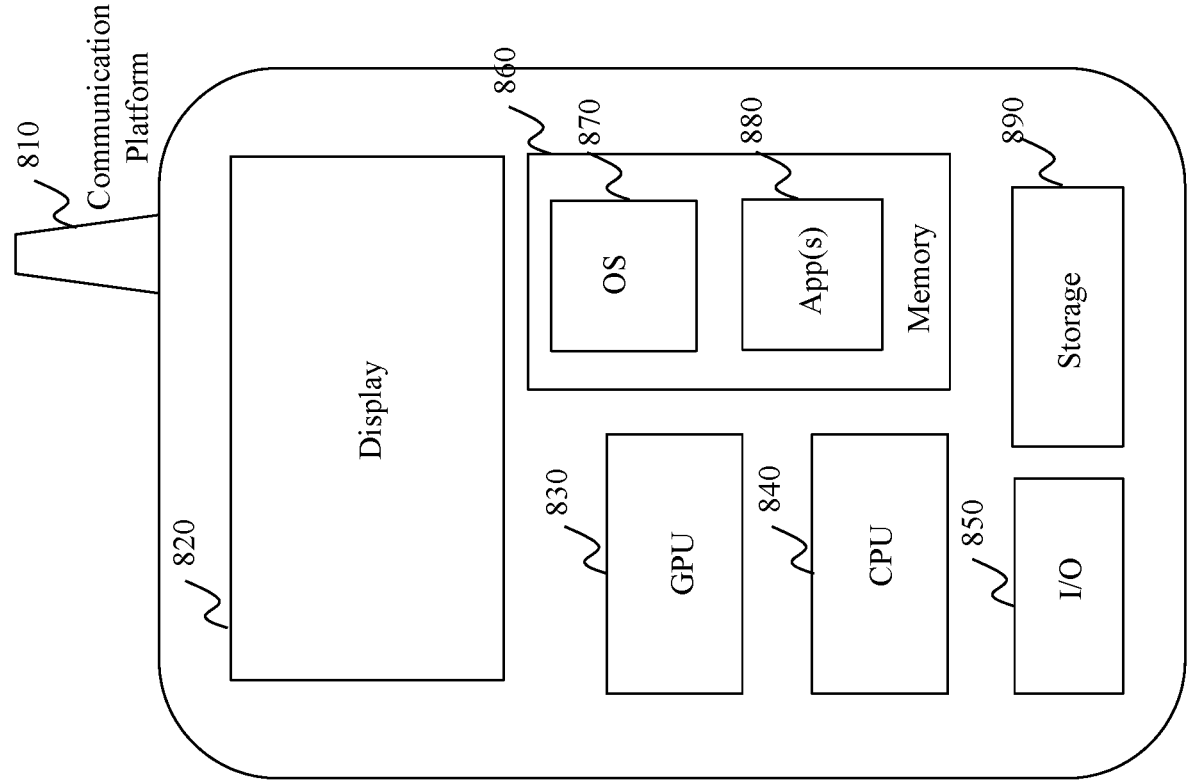

SYSTEM AND METHOD FOR PERSONALIZED AND ADAPTIVE APPLICATION MANAGEMENT

CROSS-REFERENCE TO RELATED APPLICATIONS

The present application is a continuation of U.S. patent application Ser. No. 16/233,566 filed Dec. 27, 2018 which claims priority to U.S. Provisional Patent Application 62/612,024, filed Dec. 29, 2017, the contents of which are incorporated herein by reference in their entireties.

The present application is related to International Application PCT/US2018/067630, filed Dec. 27, 2018, International Application PCT/US2018/067634, filed Dec. 27, 2018, which is hereby incorporated by reference in its entirety.

BACKGROUND

1. Technical Field

The present teaching generally relates to a computer. More specifically, the present teaching relates to computerized intelligent human-machine interaction.

2. Technical Background

With advancement of artificial intelligence technologies and the explosion of e-commerce due to the ubiquitous Internet's connectivity, computer aided dialogue systems have become increasingly popular. For example, more and more call centers deploy automated dialogue robot to handle customer calls. Hotels started to install various kiosks that can answer questions from tourists or guests. Online bookings (whether travel accommodations or theater tickets, etc.) are also more frequently done by chatbots. More and more applications such as games have sessions in which machine (the game server or agent) may have dialogues with a player.

A traditional human-machine dialogue framework is shown in FIG. 1 (PRIOR ART). In this framework, a user having a user device, e.g., 110-a, may interact with an application client, e.g., 140-a (e.g., a game engine), to carry out some programmed tasks (e.g., games). The application client 140-a may be supported by a backend system or application server 130, which carries out, e.g., significant computation work in order to support the operations of different application clients. For example, different applications may instruct different user devices to render different objects in order to render the underlying applications, respectively. In the case of game applications, each user device may be running with a different game and at different stages of the games may require rendering different objects.

In operation, in order to continue the application, the user device 110-a may provide information about its application states to a corresponding application client 140-a via the network 120. Upon receiving the application states, the application client 140-a may forward the application state information to the application server 130 and communicate with the application server 130 as to how to proceed with the game. The application server 130 may determine how to proceed with the game and accordingly instruct the application client 140-a to render an object on the user device 110-a. In such a situation, the application server 130 will send a model of the object to the application client 140-a and then the application client 140-a will forward the model to the user device 110-a so that the object can be rendered on the user device based on the model of the object. In the traditional system, the model to be used to render the object from the application server 130 fully describes the details related to the rendering, e.g., the object to be rendered (e.g., avatar), the appearance of the object, e.g., the avatar is a female, has green skin, red eyes, wrinkle skin, blue shirt, naked legs, long hair, etc.

In the framework shown in FIG. 1, the application server 130 is the backend support for many application clients 140. When models sent to the user device contain all the details related to rendering, each model takes much space and requires high bandwidth to be transmitted to the application clients. This makes the application server more difficult to scale its operation. In addition, when the application server 130 dictates how the objects are to be rendered, no consideration is taken as to who is playing the game or in what setting the user is playing the game. That is, there is no individual flavor to each game player or to each application client. This makes it less interesting to the players and may make it more difficult to engage the user.

Thus, there is a need for methods and systems that address such limitations.

SUMMARY

The teachings disclosed herein relate to methods, systems, and programming for computerized intelligent human-machine interaction.

In one example, a method, implemented on a machine having at least one processor, storage, and a communication platform capable of connecting to a network for cross network communications is disclosed. Information related to an application running on a user device is first received, which includes a state of the application and sensor data obtained with respect to a user interacting with the application on the user device. A request is sent to an application server for an instruction of a state transition of the application. A light weight model (LWM) for an object involved in the state transition is received and is personalized based on at least one of the sensor data and one or more preferences related to the user to generate a personalized model (PM) for the object, which is then sent to the user device.

In a different example, a system for cross network communications is disclosed, which includes a user device interface unit, an application client controller, a PM generator, and an application server interface unit. The user device interface unit is configured for receiving information related to an application running on a user device, wherein the information includes a state of the application and sensor data obtained with respect to a user interacting with the application on the user device. The application client controller configured for sending a request to an application server, with the state of the application, for an instruction to make a state transition of the application. The PM generator configured for personalizing a light weight model (LWM) of an object involved in the state transition from the application server to generate a personalized model (PM) for the object, wherein the personalizing is based on at least one of the sensor data and one or more preferences related to the user. The application server interface unit configured for sending the PM to the user device.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for providing cross network communications, wherein the medium, when read by the machine, causes the machine to perform a series of steps. Information related to an application running on a user device is first received, which includes a state of the application and sensor data obtained with respect to a user interacting with the application on the user device. A request is sent to an application server for an instruction of a state transition of the application. A light weight model (LWM) for an object involved in the state transition is received and is personalized based on at least one of the sensor data and one or more preferences related to the user to generate a personalized model (PM) for the object, which is then sent to the user device.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is an illustrative diagram of an exemplary mobile device architecture that may be used to realize a specialized system implementing the present teaching in accordance with various embodiments.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional human machine cross network communication systems and to provide methods and systems that enables a more efficient yet with personalized communications across the network. An application server provides backend support for an application client across the network. During the execution of an application, such as a game, the application client forwards the state of the application received from a user device (on which the application is running) to the application server. The application determines the strategy how to advance the application based on the state information. In some situations, the application server will determine to render content, e.g., an object such as a person, in the application and accordingly generate a light weight model (LWM) of the object to be used to render the object on the user device.

When the application server sends the LWM to the application client, the application client personalizes the LWM based on preferences associated with the object and/or the surrounding of the user who is running the application on the user device. The surrounding of the user may be detected via multimodal data acquired from the user device and may include visual, audio, text, or haptic information representing what is observed from the scene around the user. A personalized model generated based on the LWM based on user's preferences and surrounding individualizes how the object is to be rendered. This enhances the user experience and engagement. At the same time, because LWM carries much less information than a full model as used in conventional approaches, the traffic between the application server and the application clients is more efficient, enabling the application server to scale to serve more application clients.

Figure 1:
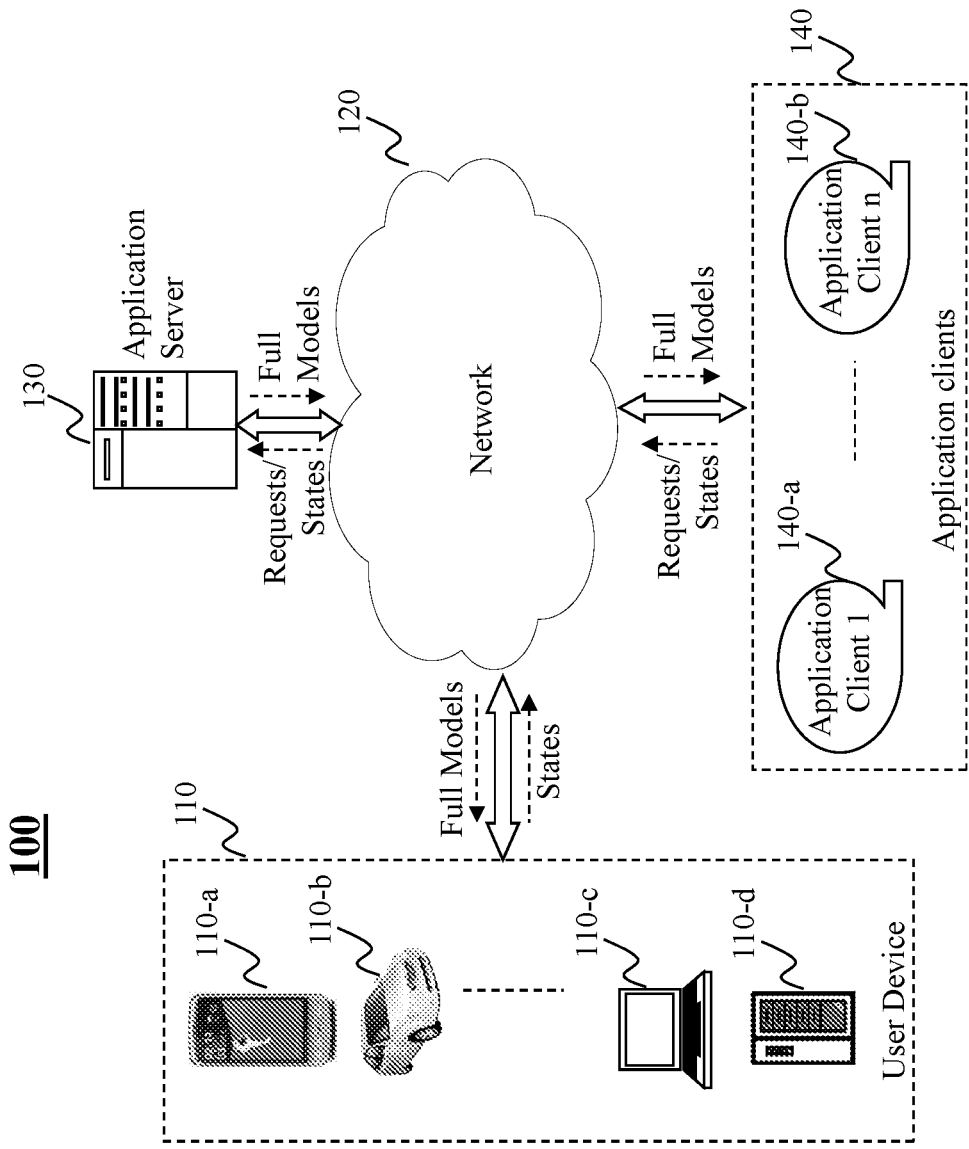
FIG. 1 (PRIOR ART) depicts a networked environment for facilitating cross network communications related to an application on a user device.
Figure 2:
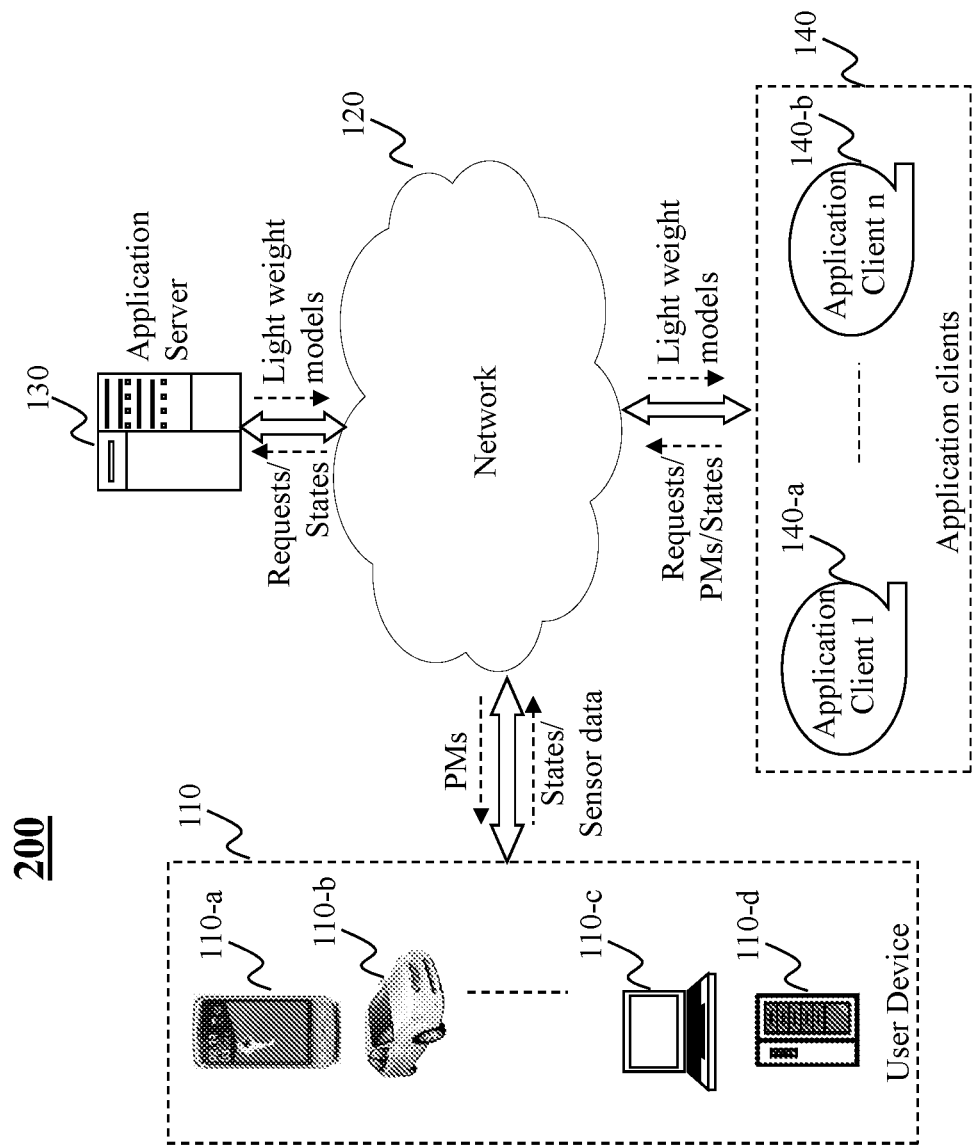
FIG. 2 depicts a networked environment for facilitating cross network communications between a user device and an application, according to an embodiment of the present teaching.
Figure 3A:
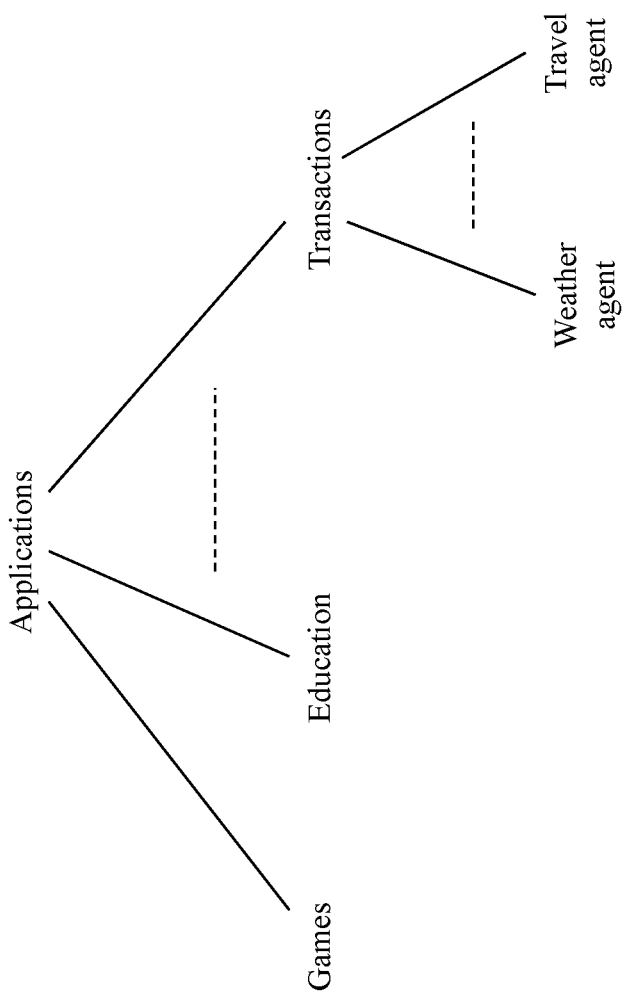
FIG. 3A illustrates exemplary types of applications that may be deployed in a networked environment with cross network communications, according to an embodiment of the present teaching.

FIG. 2 depicts a networked environment 200 for facilitating cross network communications between a user device and an application, according to an embodiment of the present teaching. As shown, environment 200 comprises one or more user devices 110, one or more application clients 140, and an application server 130. In this setting, an application is deployed on a user device and when the application is activated, the user device communicates with a corresponding application client, e.g., 140-a, which is in communication with the application server 130. The communications among different parties in this environment is via a network 120. In the present teaching disclosed herein, an application may be of different types involving different fields. FIG. 3A illustrates exemplary types of applications that may be used in environment 200. An application may be a game, an educational agent programmed via computer aided education, . . . , or any types of computerized agent configured to carry out transactions, e.g., a weather agent for answering questions related to weather, . . . , or a travel agent configured for interfacing with a user for making travel arrangements.

In the illustrated environment 200, network 120 may correspond to a single network or a combination of different networks. For example, network 120 may be a local area network ("LAN"), a wide area network ("WAN"), a public network, a proprietary network, a proprietary network, a Public Telephone Switched Network ("PSTN"), the Internet, an intranet, a Bluetooth network, a wireless network, a virtual network, and/or any combination thereof. In some embodiments, network 120 may also include various network access points (not shown). For example, environment 200 may include wired or wireless access points such as, without limitation, base stations or Internet exchange points, where base stations may facilitate, for example, communications to/from user devices 110 and/or application clients 140 or to/from application clients and the application server 130. Such communications may involve different types of sub-networks connected and one or more different types of components in the networked framework 200 across different types of network.

A user device, e.g., 110-a, may be of different types to facilitate a user operating the user device to connect to network 120 and transmit/receive signals. Such a user device 110-a may correspond to any suitable type of electronic/computing device including, but not limited to, a mobile device (110-a), a device incorporated in a transportation vehicle (110-b), . . . , a mobile computer (110-c), or a stationary device/computer (110-d). A mobile device may include, but is not limited to, a mobile phone, a smart phone, a personal display device, a personal digital assistant ("PDAs"), a gaming console/device, a wearable device such as a watch, a Fitbit, a pin/broach, a headphone, etc. A transportation vehicle embedded with a device may include a car, a truck, a motorcycle, a boat, a ship, a train, or an airplane. A mobile computer may include a laptop, an Ultrabook device, a handheld device, etc. A stationary device/computer may include a television, a set top box, a smart household device (e.g., a refrigerator, a microwave, a washer or a dryer, an electronic assistant, etc.), and/or a smart accessory (e.g., a light bulb, a light switch, an electrical picture frame, etc.).

An application client, e.g., any of 140-a, . . . , 140-b, may correspond one of different types of devices that may be configured to communicate with a user device and/or the application server 130. Each application client, as described in greater detail below, may be configured to interface with a user via a user device with, e.g., the backbone support from the application server 130. The application client as described herein may be of different types as well such as a game device, a toy device, a designated agent device such as a traveling agent or weather agent, etc. The application client as disclosed herein is capable of facilitating and/or assisting in interactions with a user operating user device with intelligence and adaptive behavior. In some applications, the corresponding application clients may be a robot which can, via the backend support from the application server 130, control certain parts for, e.g., making certain physical movement (such as head), exhibiting certain facial expression (such as curved eyes for a smile), or saying things in a certain tone (such as exciting tones) to display certain emotions.

In this illustrated network environment, when an application is running on a user device, say 110-a, it progresses by going through different state transitions and such state transitions may be triggered by interactions from the user. One example of such an application is a game running on a user device. During the execution of the application, a user operating the user device 110-a interacts with the application and such interactions may cause the application going through state transitions. For instance, when a user reacts, on his/her device, to a game rendered on the device (e.g., by controlling a character in a game to jump a bridge), such interaction with the game may cause a change in the scene of the game or may cause another character to appear in the game. That is, the object(s) appearing in the scene of the game may accordingly change.

Figure 3B:
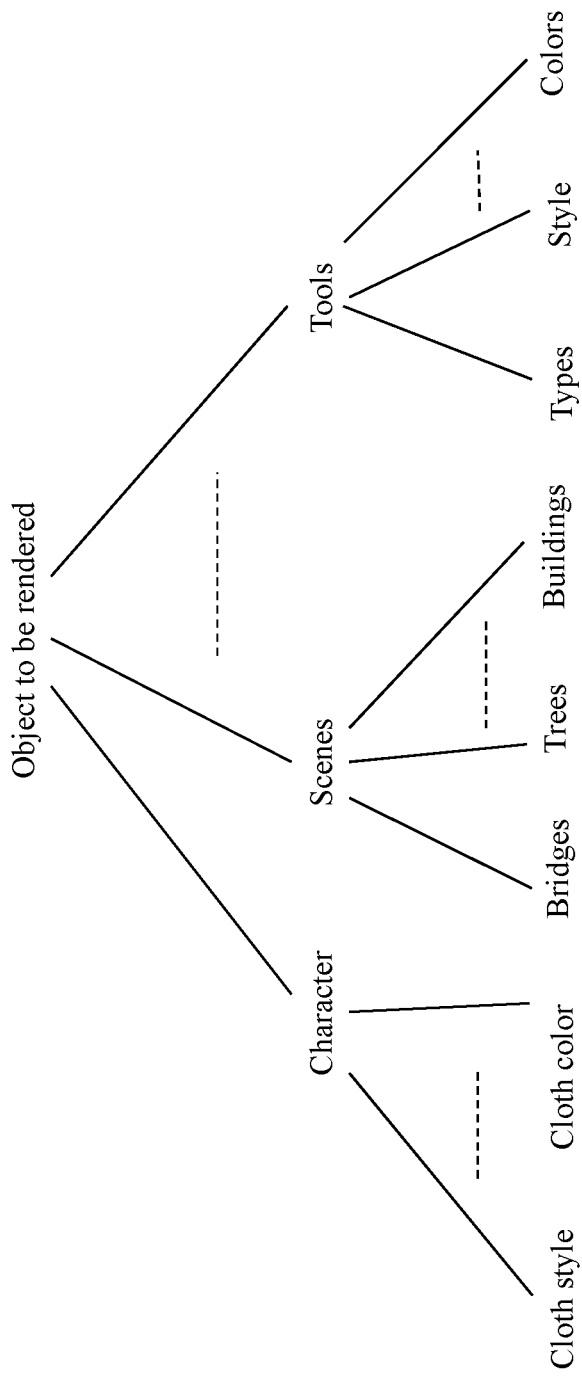
FIG. 3B illustrates exemplary types of objects that may be rendered on a user device based on cross network communications, according to an embodiment of the present teaching.

FIG. 3B illustrates different types of objects that may be rendered in an application, according to some embodiments of the present teaching. Depending on the nature of an application, an object to be rendered in the application may be a character, some object in a scene (such as a bridge, a tree, . . . , a building), . . . , or some type of tool. When an object is to be rendered (inserted) into an application, different features associated with the object need to be specified in order for the user device to render the object. For example, to render a character, which may be a man, a woman, a boy, a girl, an avatar, etc., different features associated with the character may include, e.g., cloth style, cloth color, skin color, hair color, eye color, expression, height, body build, . . . , etc. To render a scene, it may be specified what type of scene and what the scene should include or what season the scene should represent, etc. Such rendering details are traditionally provided in a full model. In the present teaching as disclosed herein, such details are specified in a personalized model that is generated by an application client based on an LWM (light weight model) received from the application server 130. Related details are provided with reference to FIGS. 5A-6C.

Referring back to FIG. 2, transitions of an application running on a user device may be controlled remotely across the network 120. In environment 200, the states associated with an application running on a user device may be transmitted from the user device to a corresponding application client. Together with the state information transmitted, the user device may also send sensor data, which may include multimodal data captured from the scene of the user. Such sensor data may be used by the application client to personalize one or more objects to be rendered on the user device as part of the transition to be applied to the application. Based on the application state, the application client forwards such information to the application server 130, which then determines, based on the application states, how to advance the application. For that, the application server 130 sends transition instruction, including LWM(s) for the object(s) to be rendered on the user device, to the application client.

Figure 3C:
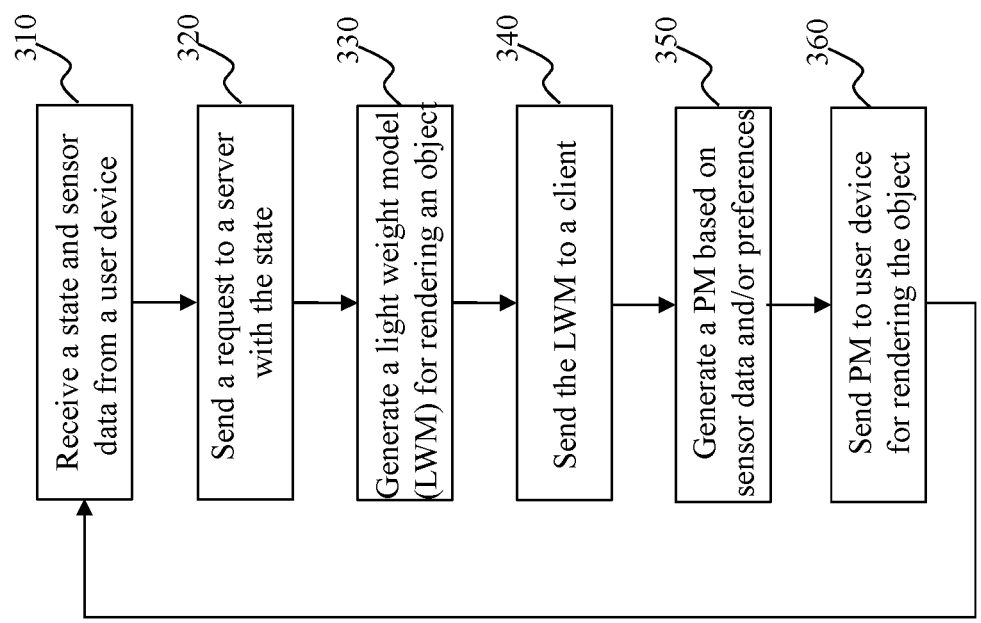
FIG. 3C is a flowchart of an exemplary process of cross network communications related to an application in a networked environment, according to an embodiment of the present teaching.

To personalize the transition, the application client takes each LWM and personalizes it to generate a personalized model (PM) for the underlying object and sends the PM to the user device with corresponding rendering instructions so that the user device can render a personalized object in the application. For instance, the application server 130 may decide to insert a new character (e.g., an avatar) into a game scene. FIG. 3C is a flowchart of an exemplary process of an application in networked communication as depicted in FIG. 2, according to an embodiment of the present teaching. During the execution of an application on a user device, an application client receives, at 310, information related to the current state of the application and/or sensor data obtained by the user device. The application client then sends, at 320, a request to the application server 130 with information that identifies the application as well as its current state. Upon receiving the request from the application client, the application server 130 determines the transition needed for the application and generates, at 330, an LWM for each object that is to be rendered in the application. Such generated LWM(s) are then sent, at 340, from the application server 130 to the application client.

In some embodiments, the application client analyzes the received sensor data to understand the surrounding of the user in order to personalize an LWM according to the observed user/surround information and/or some known user preferences. Upon receiving the LWM(s), the application client personalizes the LWM(s) to generate, at 350, a personalized model (PM) based on, e.g., known preferences of the user and/or the surround of the user obtained from the sensor data. Such personalized model PM is then sent, at 360, to the user device for rendering the underlying object in the application.

Figure 4A:
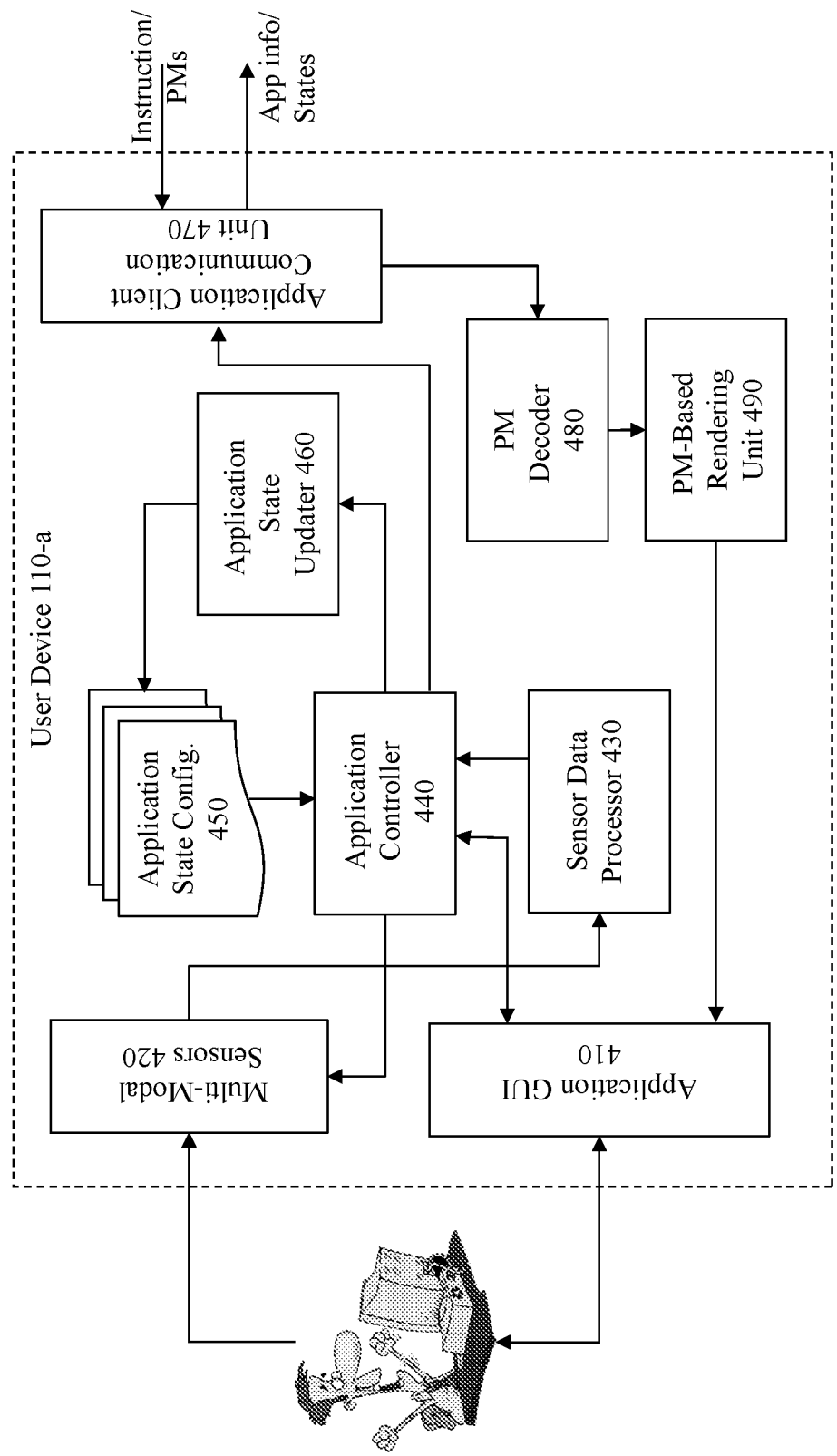
FIG. 4A depicts an exemplary high level system diagram of a user device for cross network communications related to an application, according to an embodiment of the present teaching.

FIG. 4A depicts an exemplary high level system diagram of a user device for cross network communications related to an application, according to an embodiment of the present teaching. In this illustrated embodiment, the user device, e.g., device 110-a, comprises an application graphical user interface (GUI) 410, multi-modal sensors 420, a sensor data processor 430, an application controller 440, an application state updater 460, an application communication unit 470, a PM decoder 480, and a PM-base rendering unit 490.

Figure 4B:
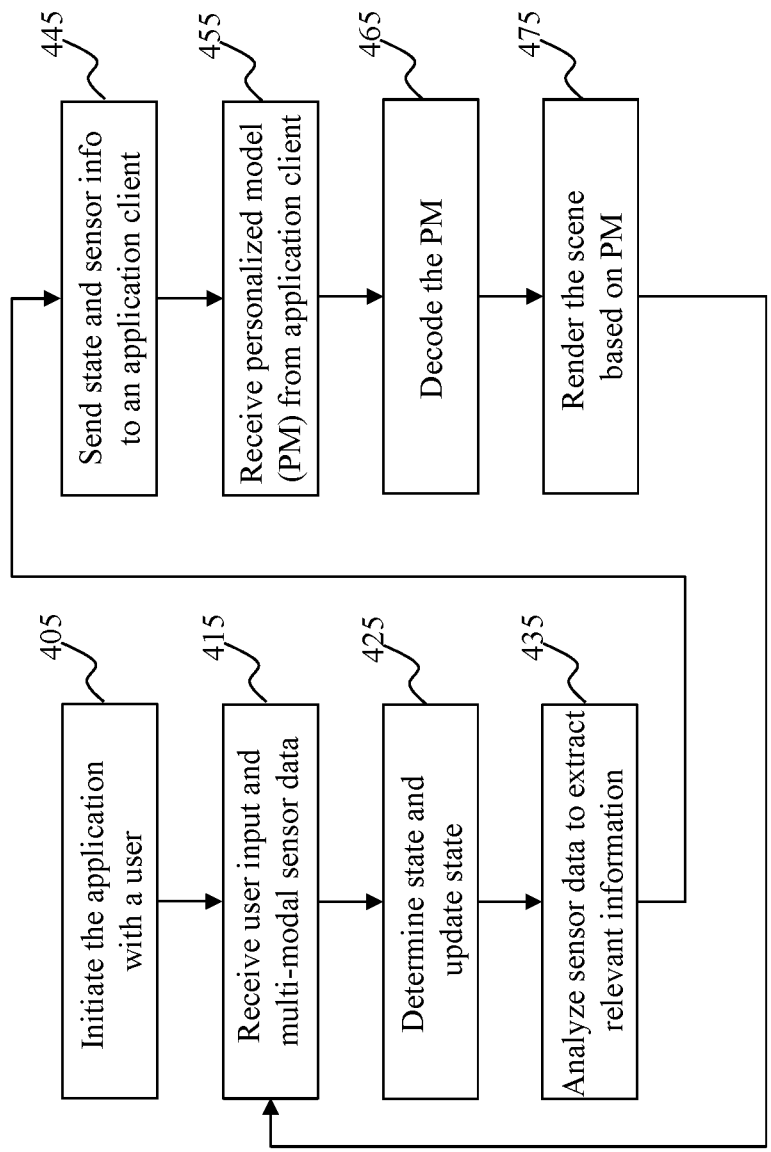
FIG. 4B is a flowchart of an exemplary process of a user device for cross network communications related to an application, according to an embodiment of the present teaching.

FIG. 4B is a flowchart of an exemplary process of a user device for cross network communications related to an application, according to an embodiment of the present teaching. The application controller 440 initiates, at 405, the execution of an application. The initiation may be triggered by the user's action, e.g., double clicking on an underlying application. Once the application is initiated, the user interacts with the application via the application GUI 410. In some embodiments, when the application controller 440 initiates the application, it may also trigger the multimodal sensors 420 to capture information related to the surrounding of the user, including information about the user and information about the environment that the user is in. During the interactions, the user's input and the multimodal sensor data are sent to the application controller 440.

When the application controller 440 receives, at 415, the user input, it determines, at 425, the state of the application and then updates, by the application state updater 460, the application state stored in 450. In some embodiments, upon receiving the sensor data, the sensor data processor 430 analyzes, at 435, the acquired sensor data to extract relevant information. Such relevant information may include, but is not limited to, the color of the cloth that the user is wearing, the background of the user (e.g., a scene of a park), sound of the scene (e.g., sound of geese), etc. To advance the application, the user device sends, via the application client communication unit 470 at 445, the dynamically obtained information (e.g., user information, the current state of the application, and relevant information from the sensors) to the application client 140, which in turn may transmit the obtained information to the application server 130, so that the server can determine how to advance the application.

The user device waits until it receives, via the application client communication unit at 455, instructions from the application client on how to advance the application. The received instruction may include a PM corresponding to an object to be rendered in the application. Upon receiving the instruction from the application client via the application client communication unit 470, the PM decoder 480 decodes, at 465, the PM and activates the PM-based rendering unit 490 to render, at 475, the object to be incorporated into the application based on the decoded PM. As discussed herein, the PM received is personalized based on the preferences of the user as well as the sensor data acquired from the scene of the user.

Figure 5A:
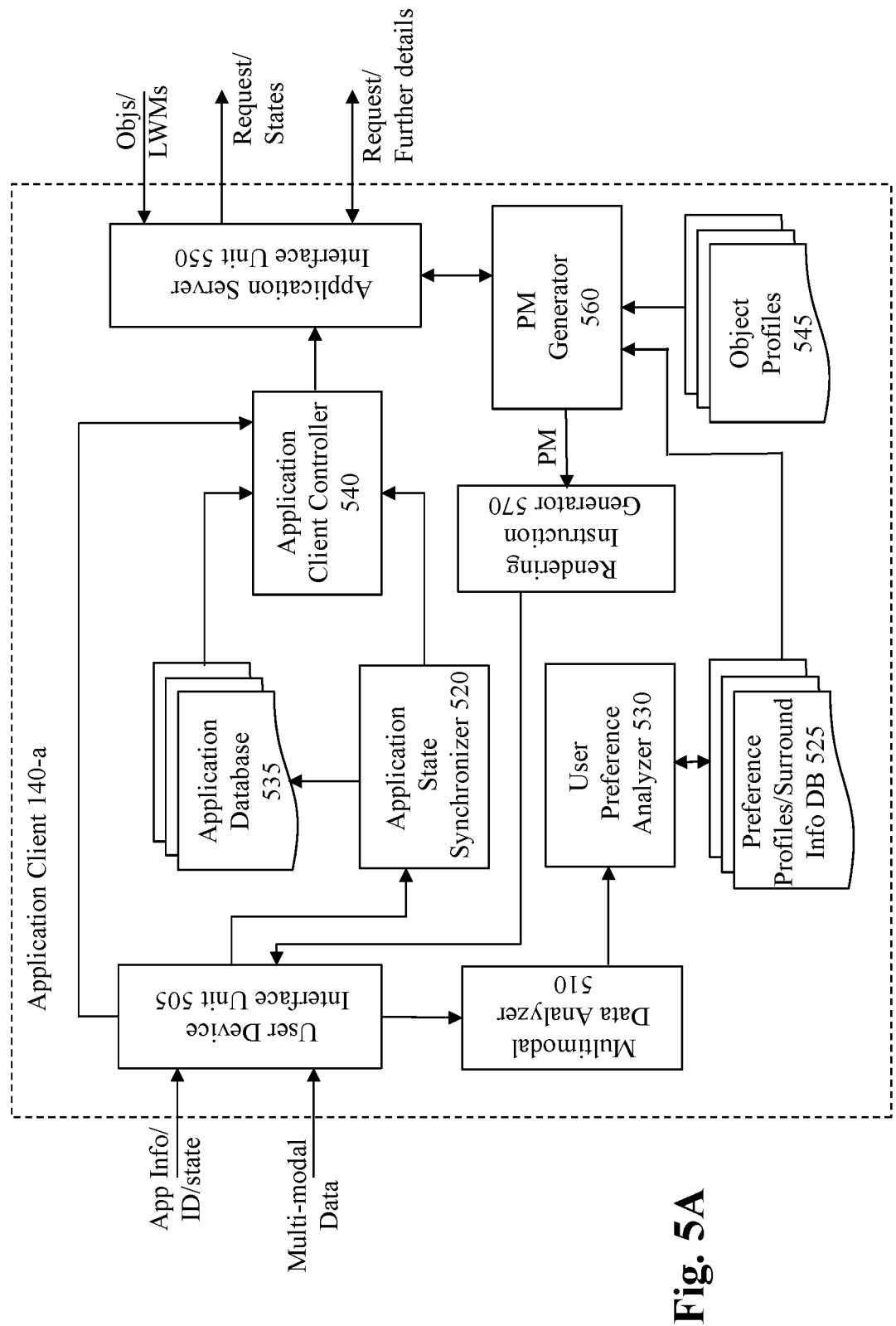
FIG. 5A depicts an exemplary high level system diagram of an application client for cross network communications related to an application, according to an embodiment of the present teaching.

FIG. 5A depicts an exemplary high level system diagram of an application client for cross network communications related to an application, according to an embodiment of the present teaching. As discussed herein, an application client is an application agent that interfaces with a user device, where the user's actions occur, and the application server 130, which provides backend support for the application. One example of an application client is an online game engine that, e.g., can be downloaded on a user device and any interaction of the user with the game via the user device is communicated to the game engine, which is turn may be in communication with a server which may manage multiple online game engines to control the progress of each instantiation of each game on each user device.

In the illustrated embodiment, the exemplary application client, e.g., 140-a, comprises a user device interface unit 505, a multimodal data analyzer 510, a user preference analyzer 530, an application state synchronizer 520, an application client controller 540, an application server interface unit 550, a PM generator 560, and a rendering instruction generator 570. One of the roles that an application client may play in the present teaching is that it takes an LWM as input (from the application server 130) and personalizes it based on preferences of the underlying user. The preferences of the user may be determined based on, e.g., some known preferences of the user or the surrounding information related to the session. Known preferences of the user may be specified (e.g., user declared) or detected previously (in other sessions) and may be stored in a user preference profile archive 525. As discussed herein, the surrounding information related to the application session may include the visual/audio information related to the user or of the surrounding environment such as video or pictures of the scene that the user in is. Such surrounding information may be obtained from the multimodal sensor data or features thereof transmitted from the user device. For example, from the video information of the user, it may be observed that the user wears a blue shirt and a red hat, and the user is a woman with long hair. The surrounding information may be identified via the visual features of the background images of the user. For instance, it may be observed that the scene is outdoor with trees and field. In some embodiments, the user device may perform certain processing locally and may send only important features to the application client. From the sensor data or features, the application client may also detect that nothing in the scene is green.

Figure 5B:
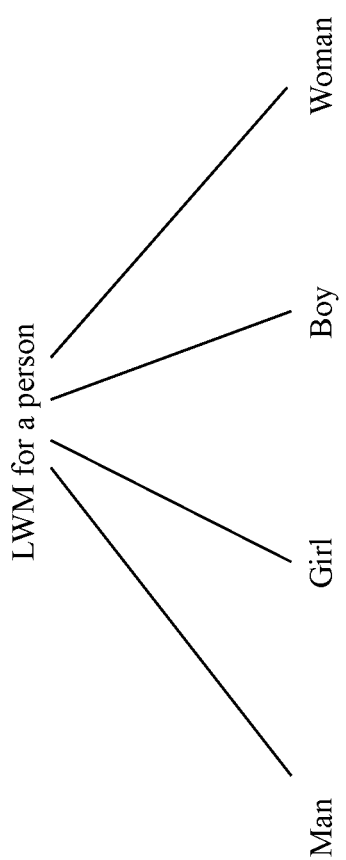
FIG. 5B illustrates a light weight model of a person generated by an application server for rendering the person on a user device, according to an embodiment of the present teaching.

FIG. 5B illustrates an LWM for a person generated by an application server for rendering the person on a user device, according to an embodiment of the present teaching. As discussed herein, an LWM is without some details so that the communications with the application server 130 can be light weight, less bandwidth, and more efficient so that the application server 130 can scale better in handling communications with all application clients. As shown in FIG. 5B, if an object to be inserted into an application is a person, the LWM may simply describe whether the character is a man, a woman, a boy, or a girl without including any detailed information. Additional details of the character may be undetermined at the server side and may later be personalized by the application client based on what is appropriate in accordance with what is observed from the surrounding of the user. This is illustrated in FIG. 5C, which shows a more detailed model for a boy character.

Figure 5C:
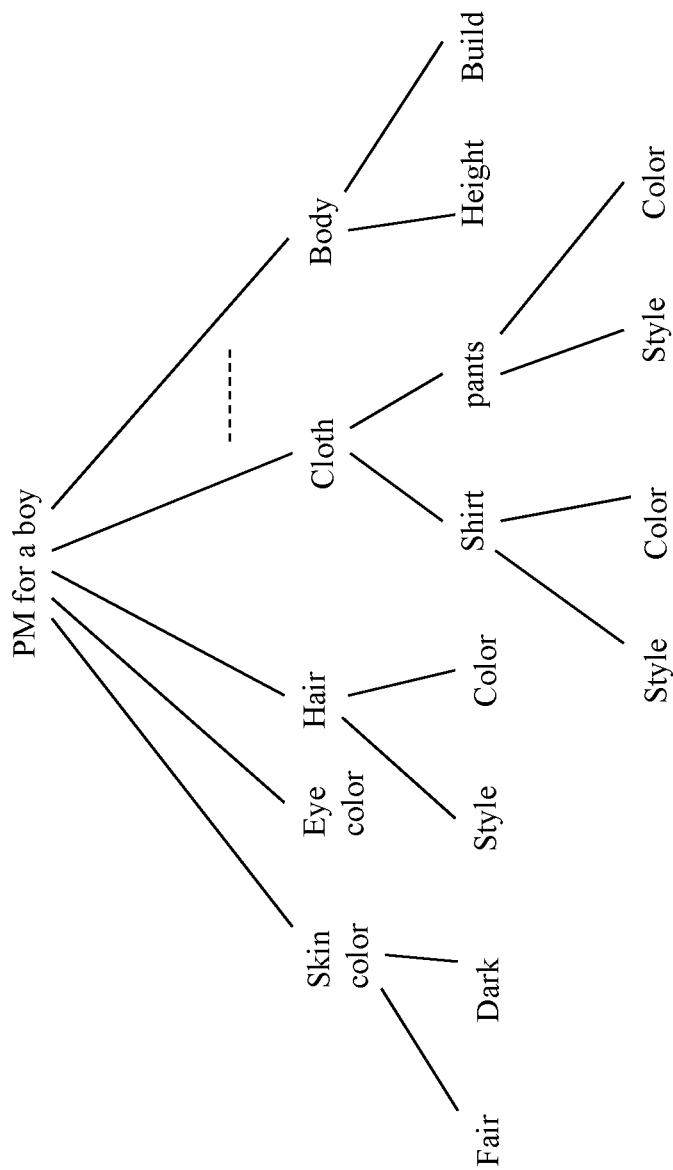
FIG. 5C illustrates a personalized model of a boy generated by an application client based on a light weight model from an application server, according to an embodiment of the present teaching.

While the application server 130 may provide an LWM which merely indicates to render a boy in the application with some additional peripheral information to specify, e.g., the location, orientation, etc. to render the boy character, a personalized model (PM) generated based on this LWM for a boy character may provide much more details such as what is shown in FIG. 5C. To render a boy, a PM may specify, e.g., the skin color, the eye color, body related parameters such as height and build, and other appearance related parameters such as hair (color and style), cloth, including shirt or pants in terms of, e.g., style and color. These personalized rendering parameters may be adaptively determined based on information related to the user such as what the user usually prefers, what the user is currently wearing, what is currently surrounding the user, and other related information. For example, if it is observed that the user is also a boy with dark eyes and dark hair, copper toned skin color, tall, fit, blue shirt, red hat, and hair covered, the LWM may be personalized to be aligned with the user, e.g., with dark hair, dark eyes, tanned skin, fit, wear red shirt and a blue hat. In some embodiments, the personalization may also consider the known preferences of the user, e.g., from previous communications, from prior records, etc. For instance, if it is known that the user loves color yellow and is a fan of Red Sox, the personalization may specify that the style of the cloth of the boy character may be a sports shirt in yellow with the logo of Red Sox on the shirt. With personalization at the application client, it not only makes the communication with the application server 130 light weight and efficient (so that to make the server more scalable), but also makes the application more attractive to users because it is done in a personal manner.

Figure 5D:
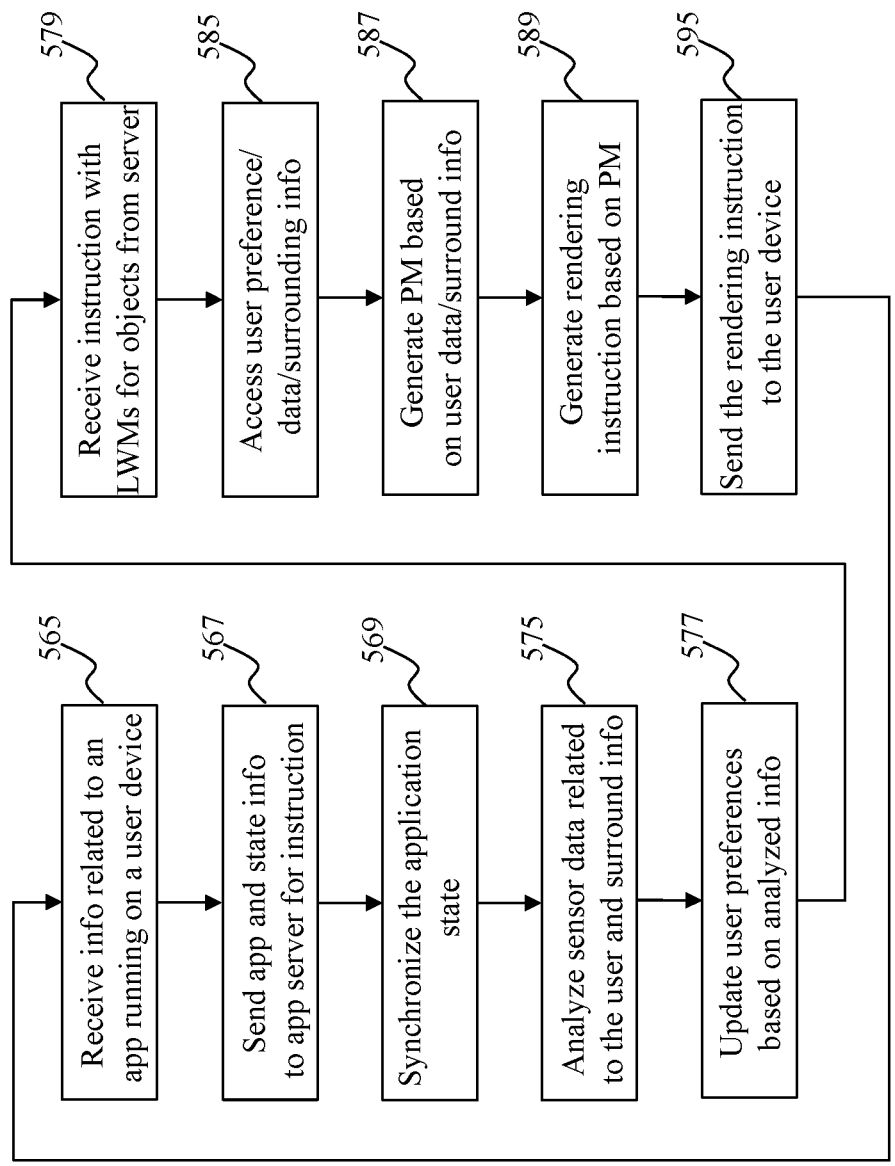
FIG. 5D is a flowchart of an exemplary process of an application client, according to an embodiment of the present teaching.

FIG. 5D is a flowchart of an exemplary process of an application client, according to an embodiment of the present teaching. In operation, when the user device interface unit 505 in an application client receives, at 565, information related to an application running on a user device, it forwards the received information identifying the application and the state of the application to the application client controller 540, which then sends, at 567, such information to the application server 130 via the application server interface unit 550. While the application client is waiting for instructions from the application server 130, the application state synchronizer 520 takes the received application state information and synchronizes, at 569, the state stored in the application database 535 with the state recorded on the user device. In addition, the multimodal data analyzer 510 analyzes, at 575, the multimodal information and/or features thereof received from the user device to derive information that may reflect the current preferences and/or the current surround information. Such analyzed information based on multimodal sensor data from the user device is used by the user preference analyzer 530 to determine dynamically the preferences of the user and the current surround information based on, e.g., previously stored preference profile of the user as well as the surround information conveyed via the multimodal sensor data. The dynamically determined user preferences and surround information may then be used to update, at 577, the user preference/surround information stored in 525, which may then be later used to personalize an LWM.

When the application client receives, via the application server interface unit 550 at 579, instructions from the application server 130 on how to advance the application, with one or more LWMs related to objects to be rendered on the user device, the PM generator 560 is invoked to personalize the received LWMs. To do so, the PM generator 560 accesses, at 585, user preference profile stored in 525 which is updated based on the most recent multimodal sensor data, and generates, at 587, a personalized PM for each received LWM in accordance with the adaptively determined user preferences and current surround information related to the user. With the personalized PMs, the rendering instruction generator 570 is then invoked to generate, at 589, instructions to be sent to the user device for advancing the application, including rendering objects based on PMs. Such generated instruction is then sent, at 595, to the user device. The operation continues by looping back to step 565 for the next round of communication.

Figure 6A:
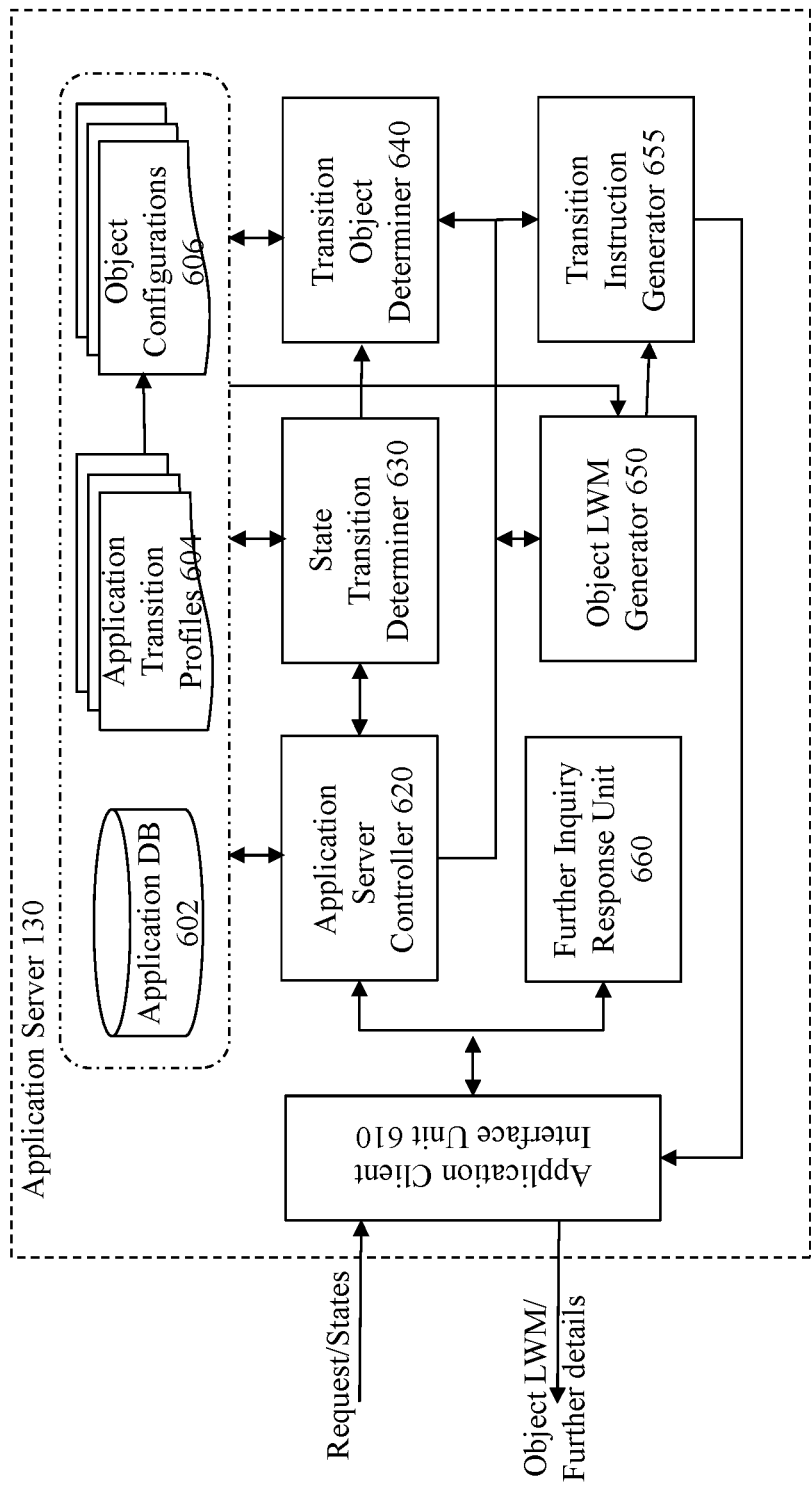
FIG. 6A depicts an exemplary high level system diagram of an application server for cross network communications related to an application, according to an embodiment of the present teaching.

FIG. 6A depicts an exemplary high level system diagram of the application server 130 for cross network communications related to an application, according to an embodiment of the present teaching. As disclosed herein, the application server 130 is the backend support for one or more application clients and it determines, based on received application state information associated with each user device from each application client, how to advance the application and instruct the application client to control the user device to advance the application accordingly. As disclosed herein, to make the communications more efficient and easy to scale, the application server 130 is to provide, together with other instructions, LWMs (rather than full models as in the prior art) for rendering objects on the user devices so that such LWMs can then be personalized by application clients to make the object rendering more relevant, engaging, attractive in order to enhance engagement and user experience.

In the illustrated embodiment, the application server 130 comprises an application client interface unit 610, an application server controller 620, a state transition determiner 630, a transition object determiner 640, an object LWM generator 650, a transition instruction generator 655, and a further inquiry response unit 660. In implementation, the application server 130 may be centralized or distributed. The application server 130 may reside in the cloud with multiple synchronized or asynchronized nodes, each of which may be principally responsible for certain geographical regions or certain designated applications. FIG. 6A as depicted may represent a single node construct and what is presented in FIG. 6A may include only components relevant to the present teaching. The actual architecture or configuration of an application may include sub-systems or parallel sub-systems for additional functionalities. However, such variations do not present as limitations to the present teaching.

Figure 6B:
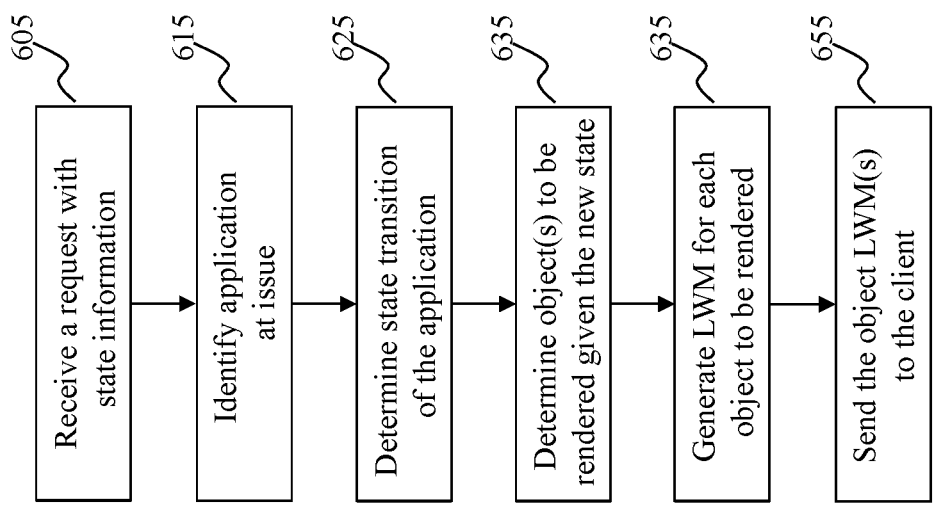
FIG. 6B is a flowchart of an exemplary process of an application server to provide a light weight model of an object to be rendered on a user device, according to an embodiment of the present teaching.

FIG. 6B is a flowchart of an exemplary process of the application server 130 as depicted in FIG. 6A to provide control of application transitions with LWMs, according to an embodiment of the present teaching. When the application client interface unit 610 receives, at 605, a request from an application client with information related to an application and a state thereof, the application server controller 620 is invoked to identify, at 615, the application in question and extract the state associated therewith. Based on such information, the application server controller 620 determines, at 625, the state transition needed for the application based on, e.g., information stored in an application database 602 and application transition profiles in 604. Once the needed transition is determined, the transition object determiner 640 is invoked to determine, at 635, whether to insert or modify an object in the application.

Such a determination may be made based on information stored in the application transition profiles 604, e.g., each transition defined in the transition profiles may specify whether it involves any insertion or modification of any object and if so, which object is to be inserted into the application and/or which object is to be modified. Such specified insertion or modification of a certain object may also point to object configurations 606 which stores various parameters to be used for rendering the object. In some embodiments, the application server 130 may store all detailed parameters for rendering each object in different settings. For instance, for a character that can be rendered in a specific game, the character may be rendered in different ways in different instantiations of the game. For each possible way to instruct how to render the character, the application server 130 may have a full range of parameters covering the details of the rendering. However, to be more efficient and light weight, the application server 130 may not incorporate all the detailed information in its instructions to an application client or by default, it generates an LWM as opposed to a full model to be sent to an application client. In some situations, certain application clients may not be capable of personalizing LWM or may be prevented from doing so in some circumstances. In such situations, an application client may request, after receiving the LWMs, the application server 130 to provide more detailed information for rendering and the application server 130 may then retrieve additional information from the object configurations 606 and provide them to the requesting application client.

Based on the application transition determined and the associated objects involved in the transition, the application server controller 620 invokes the object LWM generator 650 to generate, at 635, an LWM for each object involved in the transition and the transition instruction generator 655 to generate transition instructions. The LWM(s) generated by the object LWM generator 650 is also sent to the transition instruction generator 655 so that the instructions may be created based on the LWMs. When the transition instructions are created, the transition instruction generator 655 sends the instructions to the application client interface unit 610 that sends, at 655, such instructions to the application client.

Figure 7A:
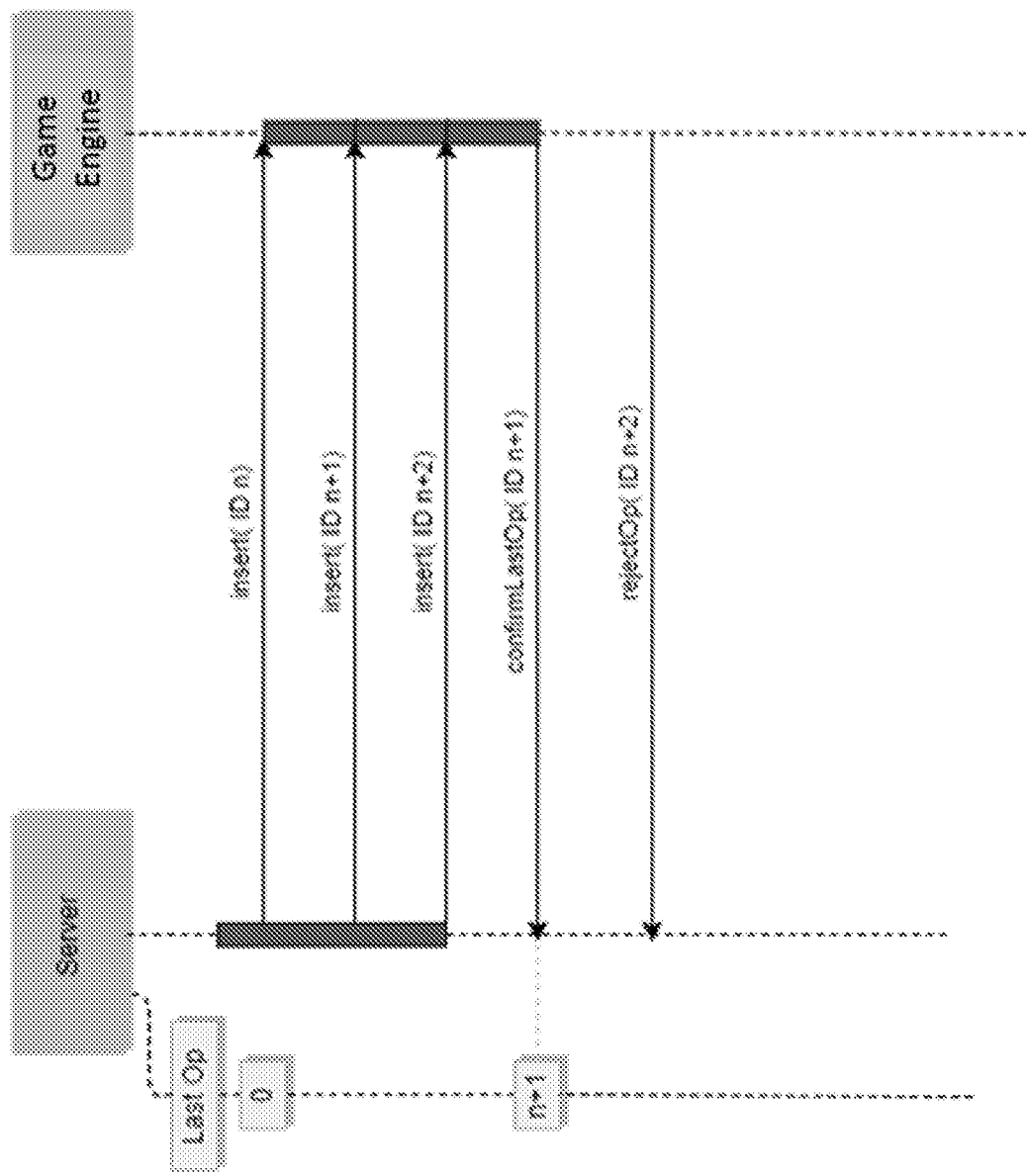
FIGS. 7A and 7B depict flow diagrams of communications between an application server and an application client, according to an embodiment of the present teaching.

FIG. 7A shows an exemplary handshake process related to the communication between the application server 130 and a game engine. As shown, upon receiving a request for providing instructions for a transition in a game, the application server instructs the game engine to insert three objects at three different time instances (n, n+1, and n+2). Upon receiving the instructions, the game engine responds with a confirmation with respect to the instruction sent at time instance n+1 but rejects the instruction corresponding to time instance n+2.

As discussed herein, in some situations, an application client may not be capable of personalizing an LWM, either partially or completely, and may, upon receiving an LWM, request the application server 130 to provide further information. For example, if there is not enough information for an application client to personalize an LWM, the application client may not be able to fully personalize, e.g., not knowing what color a user likes, the color to be used to render a boy character in a game. As another example, if the transition involves rendering a tree but there is no indication in the surround information from the user's scene which season is implicated, the application client may request the application server 130 to provide instruction as to what parameters to use on some of the objects.

Figure 7B:
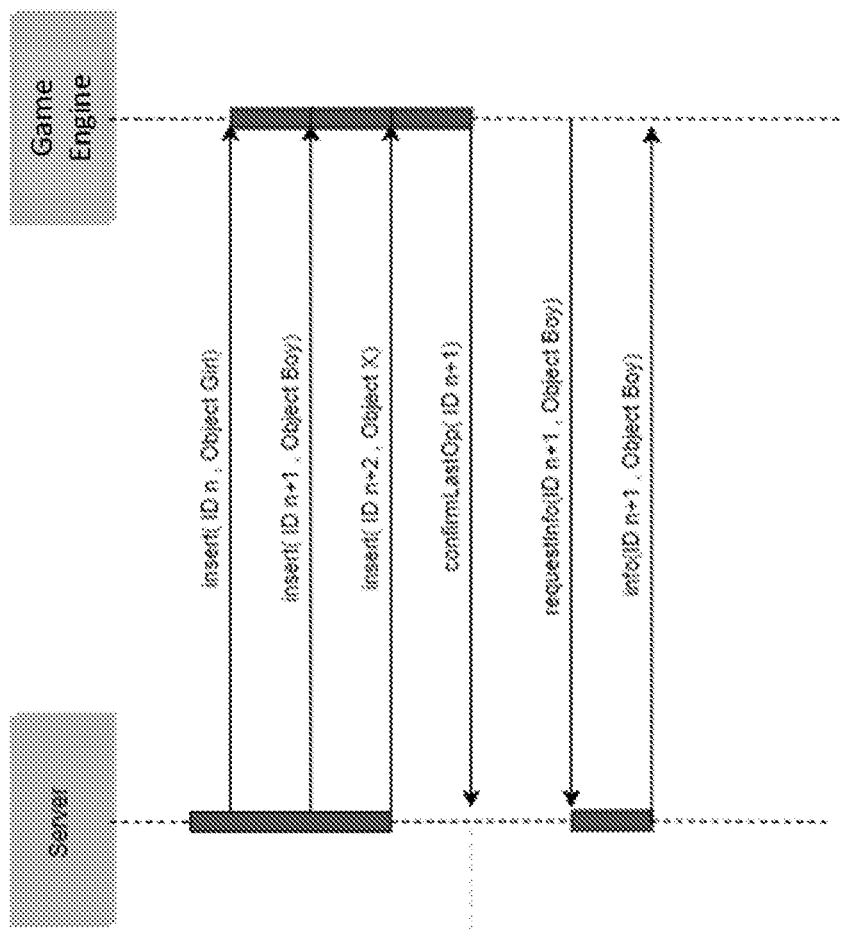

FIG. 7B shows an exemplary handshake process related to the communication between the application server 130 and a game engine, according to an embodiment of the present teaching. As shown, upon receiving a request for providing instructions for a transition in a game, the application server instructs the game engine to insert three objects at three different time instances (n, n+1, and n+2). Upon receiving the instructions, the game engine responds with a confirmation with respect to the instruction sent at time instance n+1 but requests additional information about a boy object to be rendered, i.e., asking more detailed information related to an LWM for a boy character to be rendered. In response to such a request for additional information, the application server 130 retrieves additional information related to the boy character and sends such detailed information to the application client.

Figure 6C:
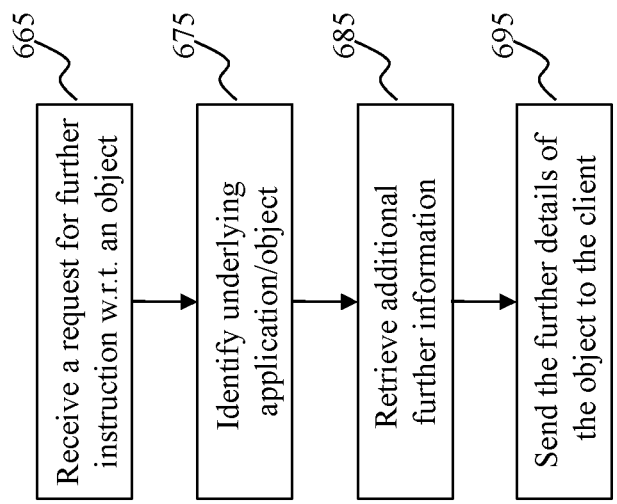
FIG. 6C is a flowchart of an exemplary process of an application server to handle a request for additional details related to a light weight model of an object to be rendered on a user device, according to an embodiment of the present teaching.

FIG. 6C is a flowchart of an exemplary process of the application server to handle a request for additional details related to an object to be rendered on a user device, according to an embodiment of the present teaching. The application client interface unit 610 receives, at 665, a request for receiving additional information related to an object to be rendered. Such a request may identify a specific application and one or more LWMs for which additional information is needed. In some embodiments, the request may also specify the specific additional details needed. Based on the request, the application server controller 620 identifies, at 675, the underlying application and optionally the prior LWMs at issue and retrieves, at 685, additional information related to the LWM. Such retrieved information is then sent to the further inquire response unit 660 that may then combine the information retrieved and generate a response. Such a response is forwarded to the application client interface unit 610, which then sends, at 695, the response with the requested further detailed information about object in questions to the application client.

FIG. 8 is an illustrative diagram of an exemplary mobile device architecture that may be used to realize a specialized system implementing the present teaching in accordance with various embodiments. In this example, the user device on which the present teaching is implemented corresponds to a mobile device 800, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 800 may include one or more central processing units ("CPUs") 840, one or more graphic processing units ("GPUs") 830, a display 820, a memory 860, a communication platform 810, such as a wireless communication module, storage 890, and one or more input/output (I/O) devices 840. Any other suitable component, including but not limited to a system bus or a controller (not shown), may also be included in the mobile device 800. As shown in FIG. 8, a mobile operating system 870 (e.g., iOS, Android, Windows Phone, etc.), and one or more applications 880 may be loaded into memory 860 from storage 890 in order to be executed by the CPU 840. The applications 880 may include a browser or any other suitable mobile apps for managing a conversation system on mobile device 800. User interactions with the content may be achieved via the I/O devices 840 and provided to an applicant client via network(s) 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 9:
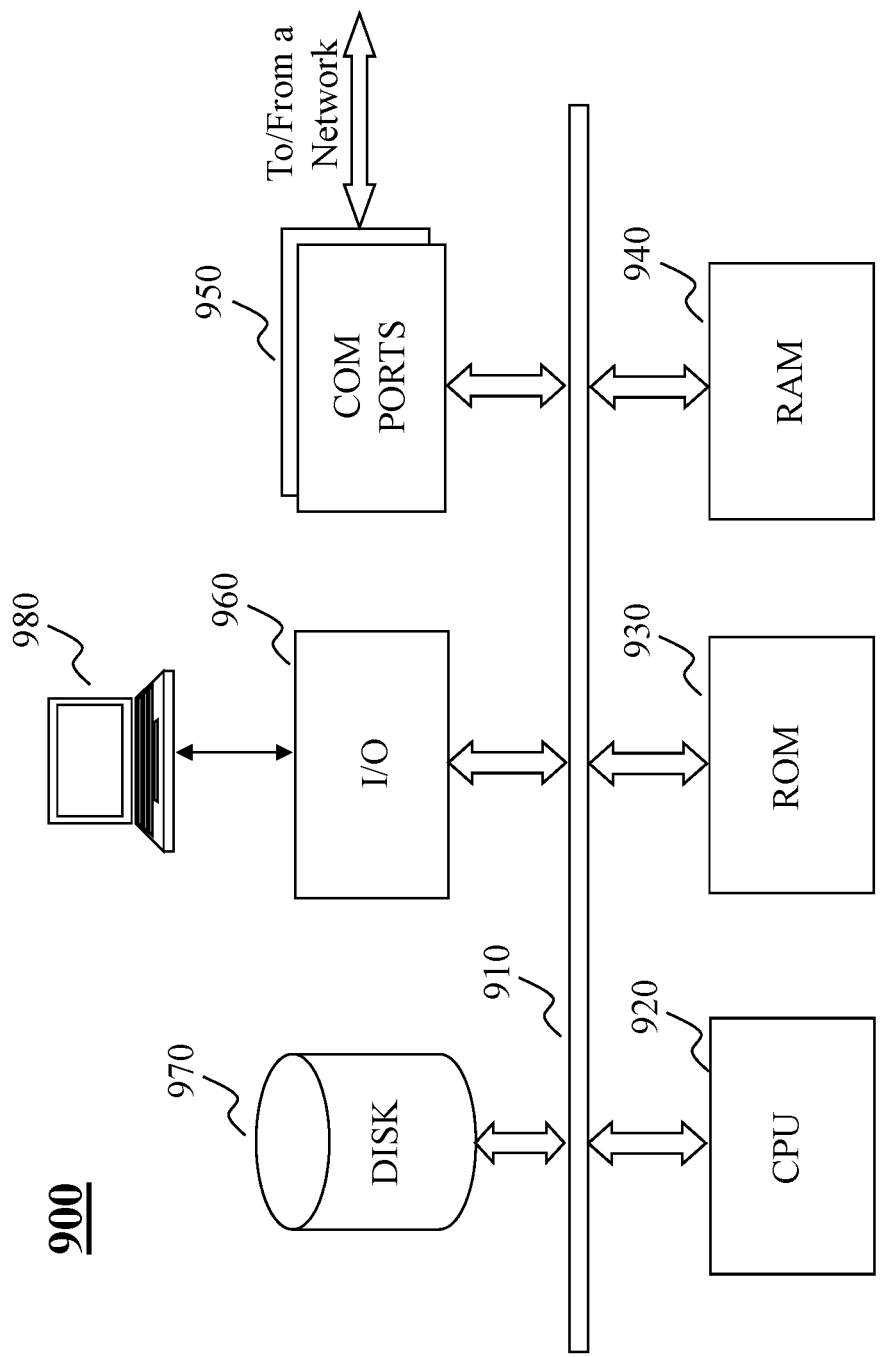
FIG. 9 is an illustrative diagram of an exemplary computing device architecture that may be used to realize a specialized system implementing the present teaching in accordance with various embodiments.

FIG. 9 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1300 may be used to implement any component of conversation or dialogue management system, as described herein. For example, conversation management system may be implemented on a computer such as computer 900, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 900, for example, includes COM ports 950 connected to and from a network connected thereto to facilitate data communications. Computer 900 also includes a central processing unit (CPU) 920, in the form of one or more processors, for executing program instructions. The exemplary computer platform includes an internal communication bus 910, program storage and data storage of different forms (e.g., disk 970, read only memory (ROM) 930, or random access memory (RAM) 940), for various data files to be processed and/or communicated by computer 900, as well as possibly program instructions to be executed by CPU 920. Computer 900 also includes an I/O component 960, supporting input/output flows between the computer and other components therein such as user interface elements 980. Computer 900 may also receive programming and data via network communications.

Hence, aspects of the methods of conversation management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and a communication platform connected to a network for cross network communications, the method comprising:
   receiving, at an application server from an application client, a request for a state transition of an application running on the application client;
   determining, by the application server, an object to be rendered in the application during the state transition;
   determining one or more parameters characterizing the object;
   generating a light-weight (LW) model of the object based on the one or more parameters; and
   transmitting, to the application client, the LW model in response to the request, wherein the LW model is to be used by the application client to generate a personalized model for the object in accordance with information about a user and a surrounding thereof, wherein the personalized model for the object is used to render the object in the application.

2. The method of claim 1, wherein the request includes a state of the application, which is used to determine the state transition.

3. The method of claim 2, wherein the state of the application is obtained based on an interaction of the user with the application on a user device.

4. The method of claim 1, wherein the information about the surrounding of the user is obtained by the application client based on sensor data acquired.

5. The method of claim 4, wherein the personalized model for the object is derived based on at least one of:
   one or more features related to the user extracted based on the sensor data;
   at least one feature associated with the surrounding of the user; and
   previously known information about preferences of the user.

6. The method of claim 1, further comprising:
   receiving another request from the application client for further parameters related to the object;
   retrieving values of the further parameters; and
   sending the values of the further parameters to the application client as a response to another request.

7. A machine readable and non-transitory medium having information recorded thereon for cross network communications, wherein the information, when read by a machine, causes the machine to perform:
   receiving, at an application server from an application client, a request for a state transition of an application running on the application client;
   determining, by the application server, an object to be rendered in the application during the state transition;
   determining one or more parameters characterizing the object;
   generating a light-weight (LW) model of the object based on the one or more parameters; and
   transmitting, to the application client, the LW model in response to the request, wherein the LW model is to be used by the application client to generate a personalized model for the object in accordance with information about a user and a surrounding thereof, wherein the personalized model for the object is used to render the object in the application.

8. The medium of claim 7, wherein the request includes a state of the application, which is used to determine the state transition.

9. The medium of claim 8, wherein the state of the application is obtained based on an interaction of the user with the application on a user device.

10. The medium of claim 7, wherein the information about the surrounding of the user is obtained by the application client based on sensor data acquired.

11. The medium of claim 10, wherein the personalized model for the object is derived based on at least one of:
    one or more features related to the user extracted based on the sensor data;
    at least one feature associated with the surrounding of the user; and
    previously known information about preferences of the user.

12. The medium of claim 7, further comprising:
    receiving another request from the application client for further parameters related to the object;
    retrieving values of the further parameters; and
    sending the values of the further parameters to the application client as a response to another request.

13. A system for cross network communications, comprising:
    an application client interface unit configured to receive, from an application client, a request for a state transition of an application running on the application client;
    a transition object determiner configured to determine an object to be rendered in the application during the state transition;
    a state transition determiner configured to determine one or more parameters characterizing the object;
    an object LWM generator configured to generate a light-weight (LW) model of the object based on the one or more parameters; and
    a transition instruction generator configured to transmit, to the application client, the LW model in response to the request, wherein the LW model is to be used by the application client to generate a personalized model for the object in accordance with information about a user and a surrounding thereof, wherein the personalized model for the object is used to render the object in the application.

14. The system of claim 13, wherein the request includes a state of the application, which is used to determine the state transition.

15. The system of claim 14, wherein the state of the application is obtained based on an interaction of the user with the application on a user device.

16. The system of claim 13, wherein the information about the surrounding of the user is obtained by the application client based on sensor data.

17. The system of claim 16, wherein the personalized model for the object is derived:
based on at least one of:
one or more features related to the user extracted based on the sensor data;
at least one feature associated with the surrounding of the user; and
previously known information about preferences of the user.

18. The system of claim 13, wherein the system is further configured to:
receive another request from the application client for further parameters related to the object;
retrieve values of the further parameters; and
send the values of the further parameters to the application client as a response to another request.

* * * * *